(12) United States Patent
Wamble, III et al.

(10) Patent No.: US 7,562,628 B2
(45) Date of Patent: Jul. 21, 2009

(54) GUIDEWAY TRANSPORTATION SYSTEM WITH INTEGRATED MAGNETIC LEVITATION SUSPENSION, STABILIZATION AND PROPULSION FUNCTIONS

(76) Inventors: John Lee Wamble, III, 9113 NE. 160th Pl., Bothell, WA (US) 98028; John Kropf, 350 N. 190th St., #622C, Shoreline, WA (US) 98133

( * ) Notice: Subject to any disclaimer, the term of this patent is extended or adjusted under 35 U.S.C. 154(b) by 0 days.

(21) Appl. No.: 11/960,616

(22) Filed: Dec. 19, 2007

(65) Prior Publication Data
US 2008/0148991 A1 Jun. 26, 2008

Related U.S. Application Data

(63) Continuation of application No. 60/870,880, filed on Dec. 20, 2006.

(51) Int. Cl.
*B60L 13/00* (2006.01)
(52) U.S. Cl. ...................... 104/281; 104/283
(58) Field of Classification Search ................ 104/124, 104/281, 282, 283, 286; 310/13
See application file for complete search history.

(56) References Cited

U.S. PATENT DOCUMENTS

| | | | | |
|---|---|---|---|---|
| 4,324,185 A | * | 4/1982 | Vinson | 104/283 |
| 5,388,527 A | * | 2/1995 | Thornton | 104/284 |
| 5,865,123 A | | 2/1999 | Powell et al. | |
| 6,510,799 B2 | | 1/2003 | Lamb et al. | |
| 6,899,036 B2 | | 5/2005 | Lamb et al. | |
| 7,204,192 B2 | | 4/2007 | Lamb et al. | |
| 2006/0081150 A1 | * | 4/2006 | Jeter et al. | 104/124 |

OTHER PUBLICATIONS

United States International Searching Authority, United States Patent and Trademark Office, International Search Report for related International Application No. PCT/US2007/088369, 2 pages, (Date completed: May 28, 2008).

* cited by examiner

*Primary Examiner*—Mark T Le
(74) *Attorney, Agent, or Firm*—Townsend and Townsend and Crew LLP

(57) ABSTRACT

A networked guideway transit system uses permanent magnet repulsion with induction-based repulsion within the networked guideway transport system, which can levitate passively with motion. Magnetic levitation technology is used to replace wheels as the primary means of vehicle suspension. The networked guideway transit system uses the permanent magnets to provide primary lift and uses electrodynamic repulsion to create centering forces at most operational speeds while integrating linear motor functions with the electrodynamic centering function. Further, the networked guideway transit system uses no moving parts in the guideways, which enhances reliability in the guideways.

11 Claims, 10 Drawing Sheets

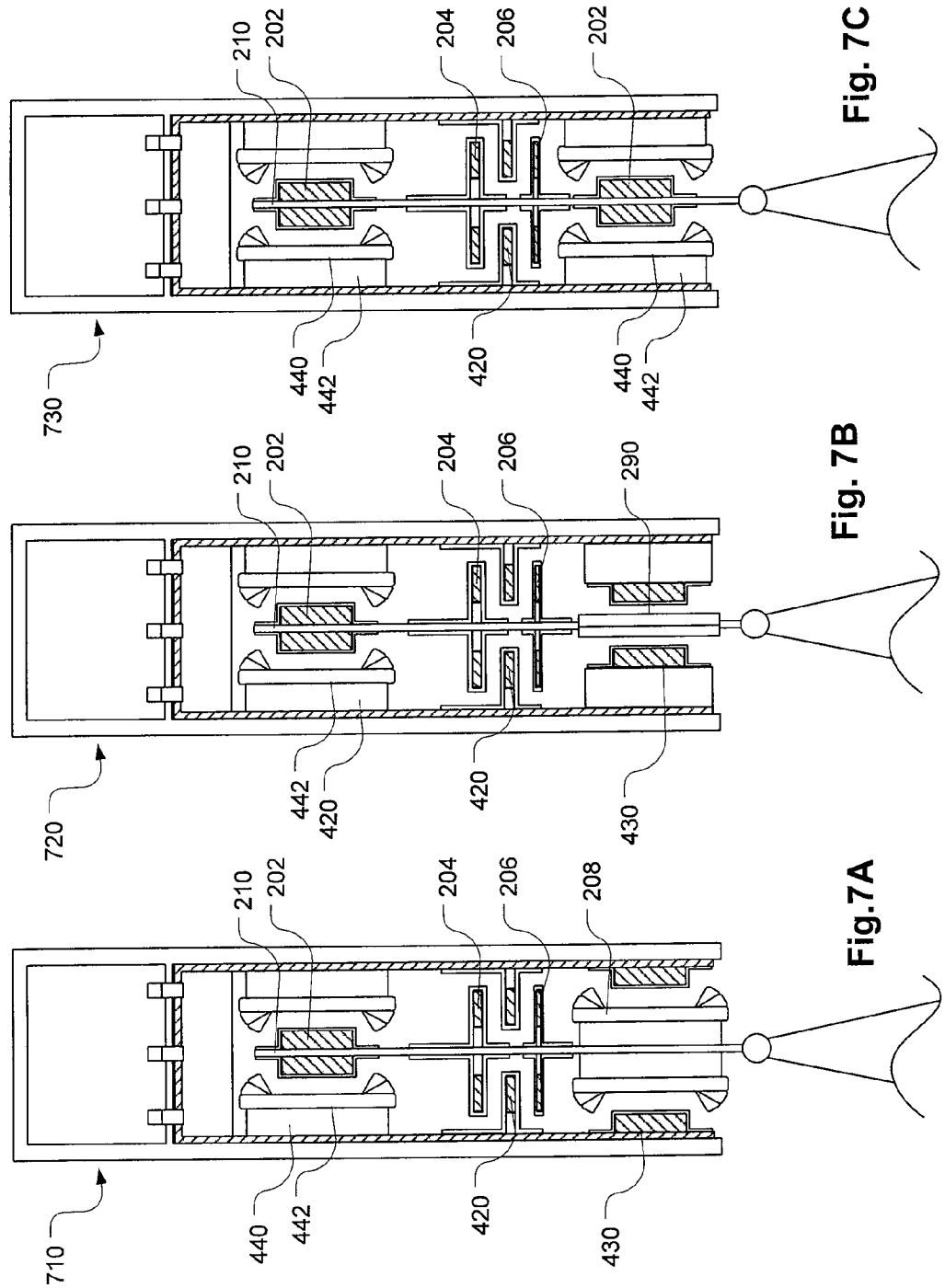

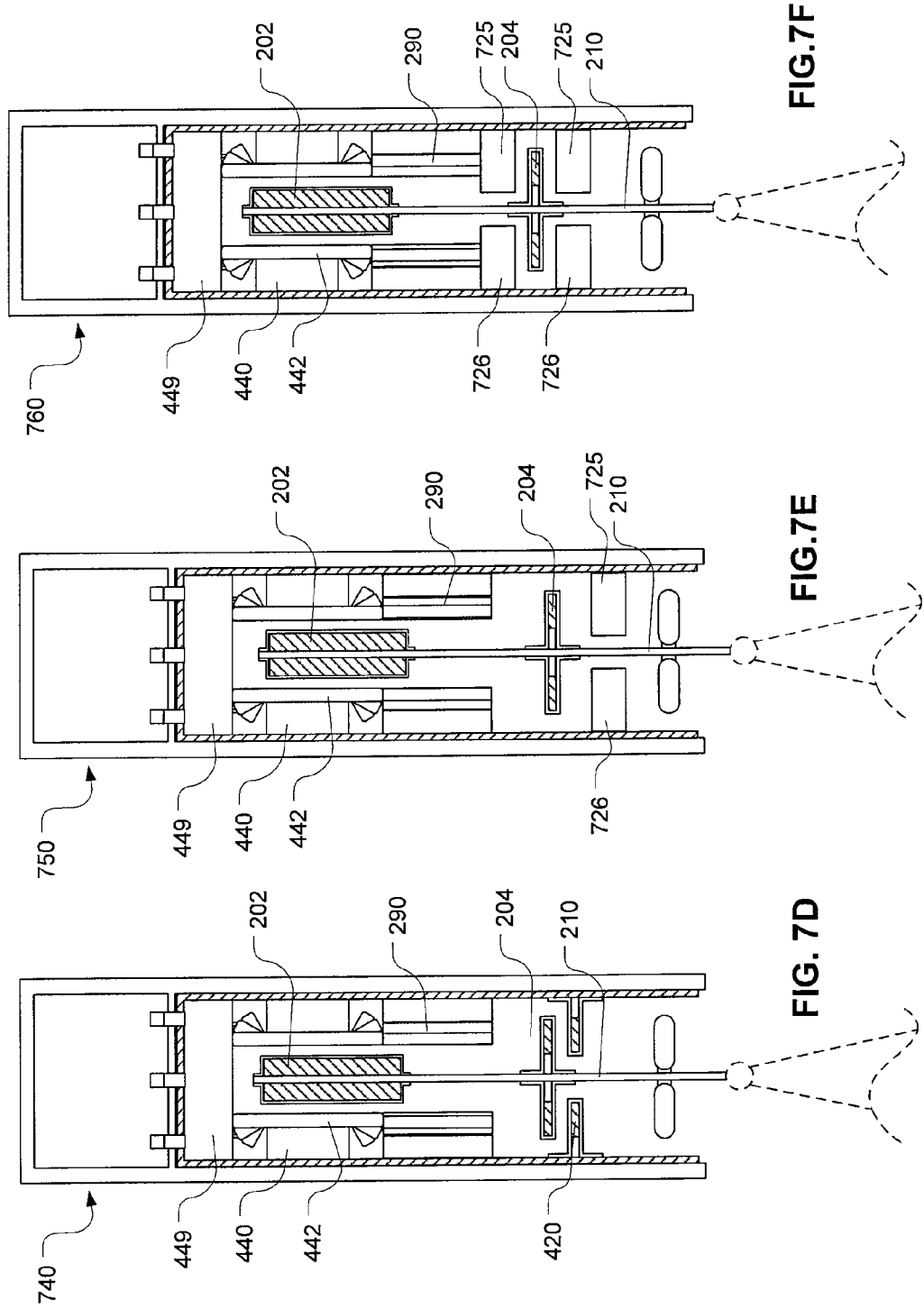

GUIDEWAY TRANSPORTATION SYSTEM WITH INTEGRATED MAGNETIC LEVITATION SUSPENSION, STABILIZATION AND PROPULSION FUNCTIONS

CROSS-REFERENCES TO RELATED APPLICATIONS

The present application claims benefit to U.S. Provisional Patent Application No. 60/870,880, filed Dec. 20, 2006, the complete disclosure of which is incorporated herein by reference.

BACKGROUND

The present invention is directed to transportation or transit systems, and more specifically, to networked guideway transit systems designed to enable the movement of large numbers of passengers or parcels in a flexible manner.

Guideway-based transportation systems have been used to transport people or goods. One example is a "Personal Rapid Transit" (PRT) system. In the PRT system, each vehicle carries just one party or small group (or payload) from their origin directly to their destination, starting at a time determined by the party's arrival at its origin. Vehicles are typically piloted by computer and move non-stop along guideways with diverging and merging paths.

The PRT system can offer great advantages over other transportation technologies using transportation means such as buses, cars, trains, etc. Because PRT vehicles can be as much as two orders of magnitude smaller than a typical line-haul mass transit vehicle, the guideway structure can be much smaller as well, and can have a commensurately smaller footprint and cost per unit length. This increases the range of possible guideway locations and permits putting the guideway where it is most needed and can work best. Likewise, by virtue of a small footprint, passenger portals can be placed at locations much more convenient for users than the typical large street station of a line-haul transit system. For instance, a portal could be inside the lobby of an office tower, or inside a shopping mall or sports arena.

However there are technical barriers to the design and implementation of effective PRT systems or guideways for the PRT systems. Generally, the PRT systems require advanced control and communication systems and methods, and the ability to manage a large network of independently traveling vehicles using complex computing and communications software and hardware.

One of the technical aspects that continue to pose a significant barrier to implement PRT systems may be the use of wheels as the primary method of suspending vehicles. Although wheels are a familiar and common technology, their associated bearing surfaces and the mechanical devices required to make wheels navigate a track network add significantly to the complexity and potential failure points of a PRT system. In addition, the unavoidable wear accompanying wheels rolling on tracks becomes a significant maintenance problem when a typical system might utilize thousands, or tens of thousands of vehicles. Further, the use of wheels imposes a speed limitation on the vehicles.

In some respects, a PRT system implemented with wheels may be suited to serve a small local region or a relatively small closed path. In networks where the pathways have a relatively tight radii, the maximum speeds are limited by the maximum lateral accelerations permitted for the wheels. Such systems may work well in their limited capacities and can serve to demonstrate the viability of the basic PRT concept. But any effort to build a larger network or to link smaller networks together across realistic travel distances will face the wheel related problems. In this regard, keeping a wheeled system cheap and reliable generally means keeping the maximum speeds relatively low. And keeping the maximum speeds low means the transit times for the greater distances will be unacceptably long for most patrons. In other words, expanding a local circulator or linking two local circulator PRT systems is not practical with vehicle using small wheels. However, building a larger wheel-based PRT system may be prohibitively expensive. Current PRT systems lack an economical, reliable and lightweight means to carry vehicles in slower speed, tight systems and faster, longer distance systems.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system to integrate magnetic levitation technologies within a networked guideway transit system is provided. The magnetic levitation is used to replace wheels as the primary means of vehicle suspension and thus the automated transit system (e.g., PRT system) can be made commercially, economically, and politically feasible. In some embodiments, the networked guideway transit system combines permanent magnet levitation with electrodynamic stabilization and linear motor propulsion. That is, the networked guideway transit system uses the permanent magnets to provide primary lift and uses electrodynamic repulsion to create centering forces at most operational speeds while integrating linear motor functions with the electrodynamic centering function.

In accordance with another embodiment of the present invention, a vehicle bogie is provided for the networked guideway transit system. The vehicle bogie includes a plurality of bogie segments that use permanent magnet repulsion (PMR) components to provide primary lift, which works at all speeds while using an electrodynamic repulsion (EDR) centering subsystem to create centering forces at most operational speeds. In addition, in the EDR centering subsystem, linear motor functions are integrated with the electrodynamic centering function.

In accordance with yet another embodiment of the present invention, a guideway structure that comprises several modular guideway blocks for the guideways is provided. Each modular guideway block includes a propulsion coil component, a first permanent magnet component comprising permanent magnets arranged in a linear array on a wall of the modular guideway block where the first permanent magnet component provides lifting and vertical clamping forces and a second permanent magnet component for providing propulsion forces. The permanent magnets in the first permanent magnet component are arranged in homopolar linear arrays, the long axis of the arrays aligned in a travel direction of a vehicle.

In accordance with yet another embodiment of the present invention, a networked guideway transit system that utilizes permanent magnet levitation and electrodynamic repulsion is provided. The networked guideway transit system includes a vehicle bogie that comprises a set of bogie segments, each bogie segment including a bogie levitation component for lifting a vehicle, a bogie electrodynamic repulsion component for passively centering the vehicle bogie that is moving and a bogie linear propulsion component for providing propulsion forces on the vehicle bogie. The networked guideway transit system also includes a guideway that comprises a set of modular guideway blocks, each modular guideway block including a guideway levitation component for lifting the vehicle and a guideway linear propulsion component, wherein the bogie linear propulsion component is arranged to be in opposition to the guideway linear propulsion component.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A-7F are cross-sectional views of different embodiments of the bogie segment and the modular guideway block used in the networked guideway system.

DETAILED DESCRIPTION OF EXEMPLARY EMBODIMENTS

Figure 1A:
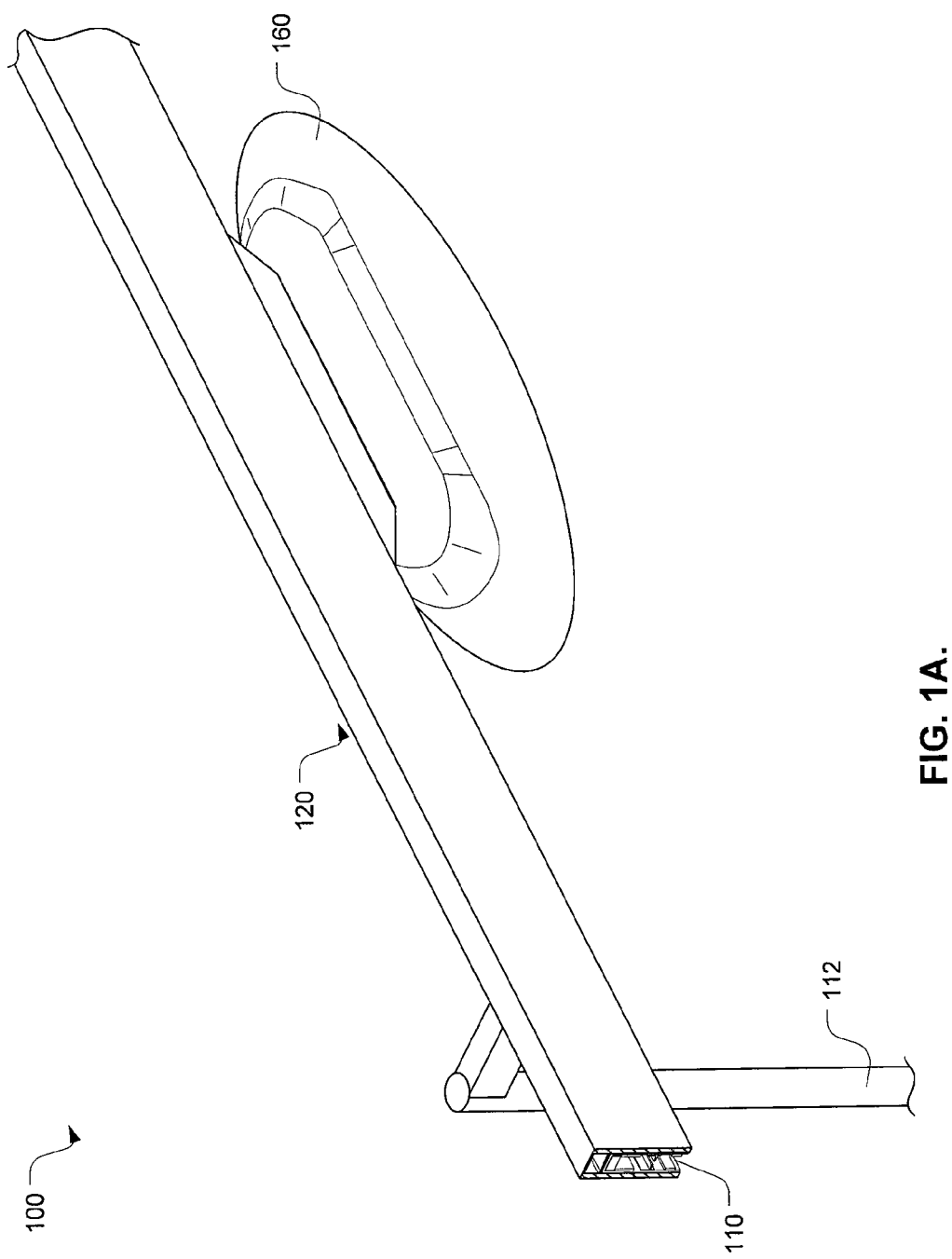
FIG. 1A is a perspective view of a networked guideway system in accordance with an embodiment of the present invention.

A method and system to integrate magnetic levitation technologies within a networked guideway transit system is provided. The magnetic levitation is used to replace wheels as the primary means of vehicle suspension and thus the automated transit systems (e.g., PRT system) can be made commercially and economically feasible. More specifically, a method and system use permanent magnet repulsion with induction-based repulsion within the networked guideway transport system, which can levitate passively with motion.

Generally described, the networked guideway transit system combines permanent magnet levitation with electrodynamic stabilization and linear motor propulsion. That is, the networked guideway transit system uses the permanent magnets to provide primary lift and uses electrodynamic repulsion to create centering forces at most operational speeds while integrating linear motor functions with the electrodynamic centering function. Further, the networked guideway transit system uses no moving parts in the guideways, which enhances reliability in the guideways.

Magnetic Levitation

Magnetic levitation (hereinafter, "Maglev") may provide advantages compared to traditional wheels on tracks. Generally, Maglev has low or zero mechanical friction and thus parts in a Maglev system do not wear from contact. It has a wide range of speeds over which it can operate and in operation it generates relatively low noise levels. Conventionally, Maglev as applied to traditional large train system architecture provides only marginally improved service characteristics, i.e. primarily shorter transit times on long runs where extreme ground speeds are attainable and practical. Because aerodynamic losses prevail at high speeds and powerful propulsion systems are required to overcome these losses, the extreme ground speeds achievable with Maglev are only feasible with large trains and large footprint guideways, and are obtained at an enormous energy cost. And with existing complex Maglev systems that require sensors, positional feedback, active control, or even active levitation power, this marginal benefit comes at much higher cost in basic infrastructure, and at increased risk for technical or operational problems.

In general, the combination of functional capabilities of Maglev technology and PRT systems may have been considered counterintuitive. The counterintuitive nature of this relationship is due to the failure of recognizing the performance potential of the respective technologies. In contrast, in forgoing described and supplied embodiments of the present invention, using a proper form of Maglev technology to replace wheels as the primary means of vehicle suspension makes a networked guideway transit system both feasible and commercially achievable as a method of moving vehicles. In addition, linear motor propulsion used with the Maglev suspension allows the great majority of the guideway to have no contact and little mechanical friction. This means less wear and less dust is generated compared to conventional Maglev systems, both of which factors contribute to lowering maintenance and improving reliability.

Guideway Transit System

As will be discussed in greater detail below, a networked guideway transit system 100 includes levitation, centering and propulsion components, utilizing permanent magnets to provide primary levitation and electrodynamic repulsion to create centering forces.

Figure 1B:
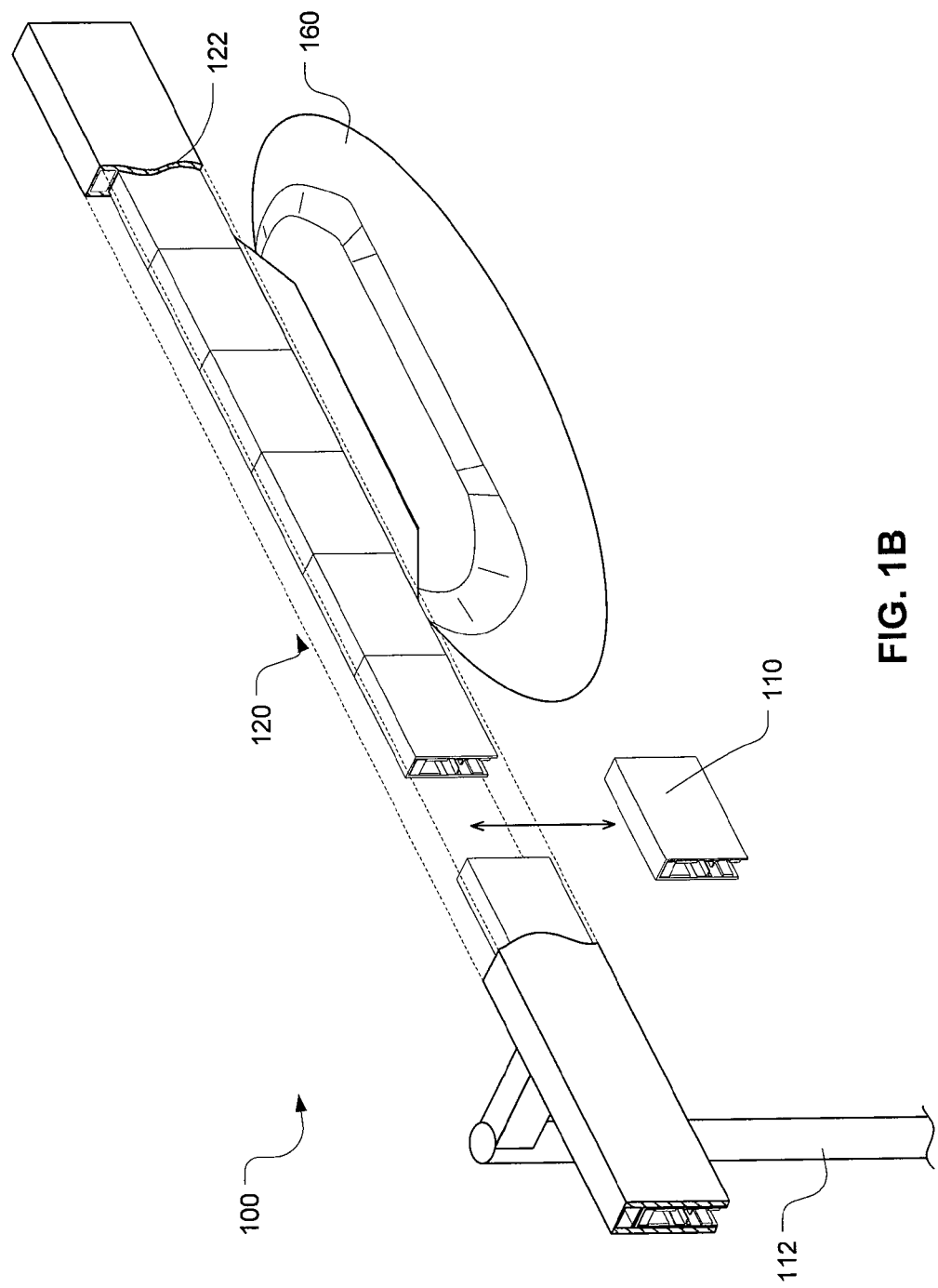
FIG. 1B is a perspective view of the networked guideway system showing an exposed view of modular guideway blocks of the guideway in accordance with an embodiment of the present invention.

With reference to FIGS. 1A and 1B, perspective views of a networked guideway transport system 100 are depicted in accordance with some embodiment of the present invention. The networked guideway transit system 100 generally includes a guideway 120 and a mating vehicle 160. The guideway 120 has a suitable geometry to support and guide the vehicle 160 at any speed reasonably associated with such a networked guideway transit system. The guideway 120 may include several modular guideway blocks that are straight and short segments of the guideway. As used herein, the modular guideway block refers to a basic unit of the guideway. As depicted in FIG. 1B, the modular guideway blocks may be loaded into a shell that forms the guideway structural beam 122 to carry the load between support columns 115.

In the networked guideway transit system 100, the vehicle 160 is supported by a vehicle bogie (not shown) that interlocks with the guideway 120. As will be discussed in detail below, the vehicle bogie is a guideway element that couples a vehicle to the guideway. The vehicle bogie used for the networked guideway transit system may include several bogie segments, each of which includes levitation, centering and propulsion components. Each bogie segment may have a finite length in order to fit in a single modular guideway block 110. One non-limiting example of the bogie segment is shown in FIGS. 2A and 2B.

It is noted that the figures described herein are not meant to show the exact or relative sizes, or the locations of the various components, but rather to illustrate the general configuration for the purposes of the discussion.

Figure 2A:
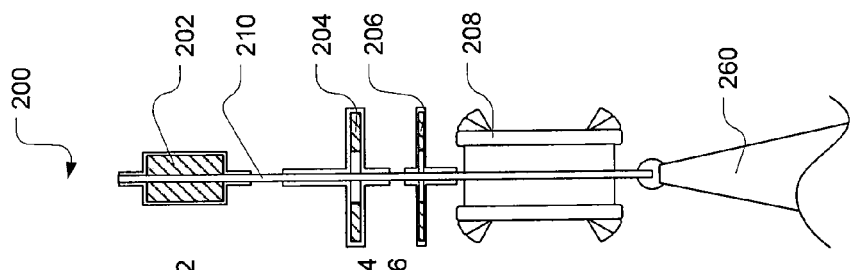
FIGS. 2A and 2B are cross-sectional views of an exemplary embodiment of a bogie segment used in the networked guideway system.
Figure 2B:
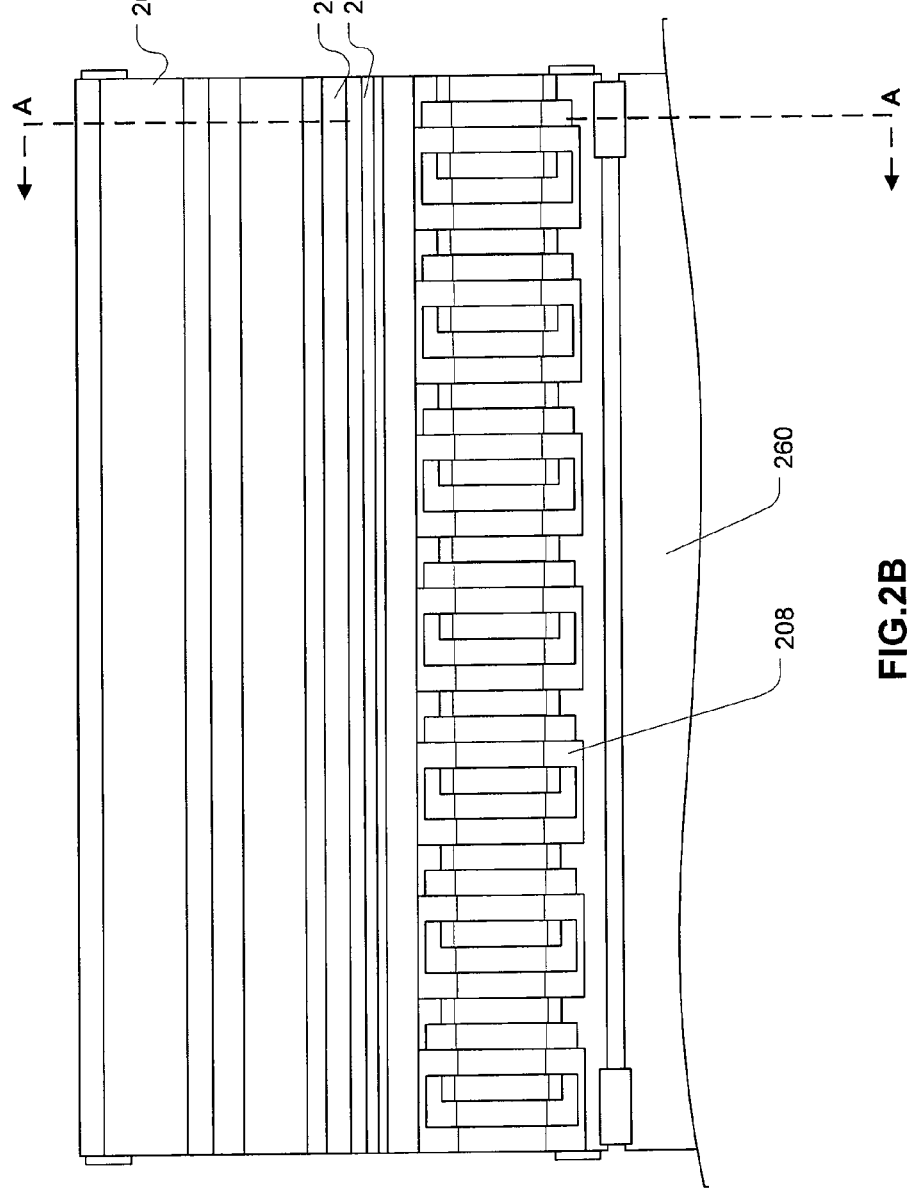

FIGS. 2A and 2B illustrate cross sectional views of the bogie segment 200 in accordance with an embodiment of the present invention. The bogie segment 200 includes primary permanent magnet repulsion (PMR) arrays, such as a bogie lifting magnet unit 204, that provide upward forces on the vehicle bogie. The bogie segment 200 further includes clamping magnets, for example a bogie clamping magnet unit 206, that provide downward or vertical clamping forces on the bogie.

The clamping magnets of the bogie segment 200 are additional static magnetic field sources, generally high field permanent magnets with poles aligned so as to be in repulsion to magnets on the guideway. It is noted that the clamping magnets are static magnets and can be located on the guideway or the vehicle bogie. In the illustrated embodiment, the bogie clamping magnet unit 206 is located on the vehicle bogie and makes use of the bottom sides of the guideway magnets to produce repulsion. In this embodiment, the bogie clamping magnet unit 206 may be used to add a downforce to the overall vertical force on the bogie segment 200. It is further noted that the bogie clamping magnet unit 206 may be sized and positioned as appropriate such that the bogie clamping magnet unit 206 does not significantly decrease the levitation height provided by the bogie lifting magnet unit 204, but in the event the vehicle bogie rides too high because of load perturbations, the bogie clamping magnet unit 206 forces the bogie back down more rapidly than gravity alone. This may stiffen the suspension and assist to maintain the vertical position of the vehicle bogie. Also, in the case where an end of the vehicle bogie protrudes into a section of the guideway that does not contain PMR components for lifting, the bogie clamping magnet unit 206 may prevent the protruding end of the vehicle bogie tipping down into that unsupported section by holding down the opposite end.

In addition, the bogie segment 200 can include a passive centering device (e.g. a device including the electrodynamic repulsion (EDR) centering components 208) that comprises moving coils or conductor stacks. The EDR centering components 208 may primarily provide centering forces but may also provide some propulsion forces to the bogie segment 200. The bogie segment 110 may contain more PMR components (linear magnetic arrays) for mating, such as a bogie propulsion magnet unit 202, each arranged to be in opposition to corresponding PMR components (linear magnetic arrays) in the guideway.

In one embodiment, the EDR centering components 208 may also function as propulsion components. As will be discussed in greater detail below, the coils in the conductor arrays (not shown) of the EDR centering components 208 are energized to provide forward thrust or regenerative braking by interaction with the magnets arranged in the guideway. The electrical power may be delivered to the moving coil, the stationary coil or a combination thereof. In some embodiments, both stationary and moving coils are included in the vehicle bogie. In such embodiments, the stationary coils can deliver primary electrical power to the vehicle bogie, which is converted to the kinetic energy of motion, while the moving coils deliver secondary electrical power to the onboard energy supply by tapping into the same kinetic energy. In this manner, the electrical power can be transmitted from the guideway to the vehicle bogie (eventually to the vehicle) without contact. The stationary coils may be combined into a modular guideway block. It is noted that the bogie segment described in conjunction with the aforementioned embodiments may include other components well known in the transportation art but not shown for ease of illustration, such as centering rollers, skids, electric motors that provide a drive source to the vehicle, etc.

Figure 3A:
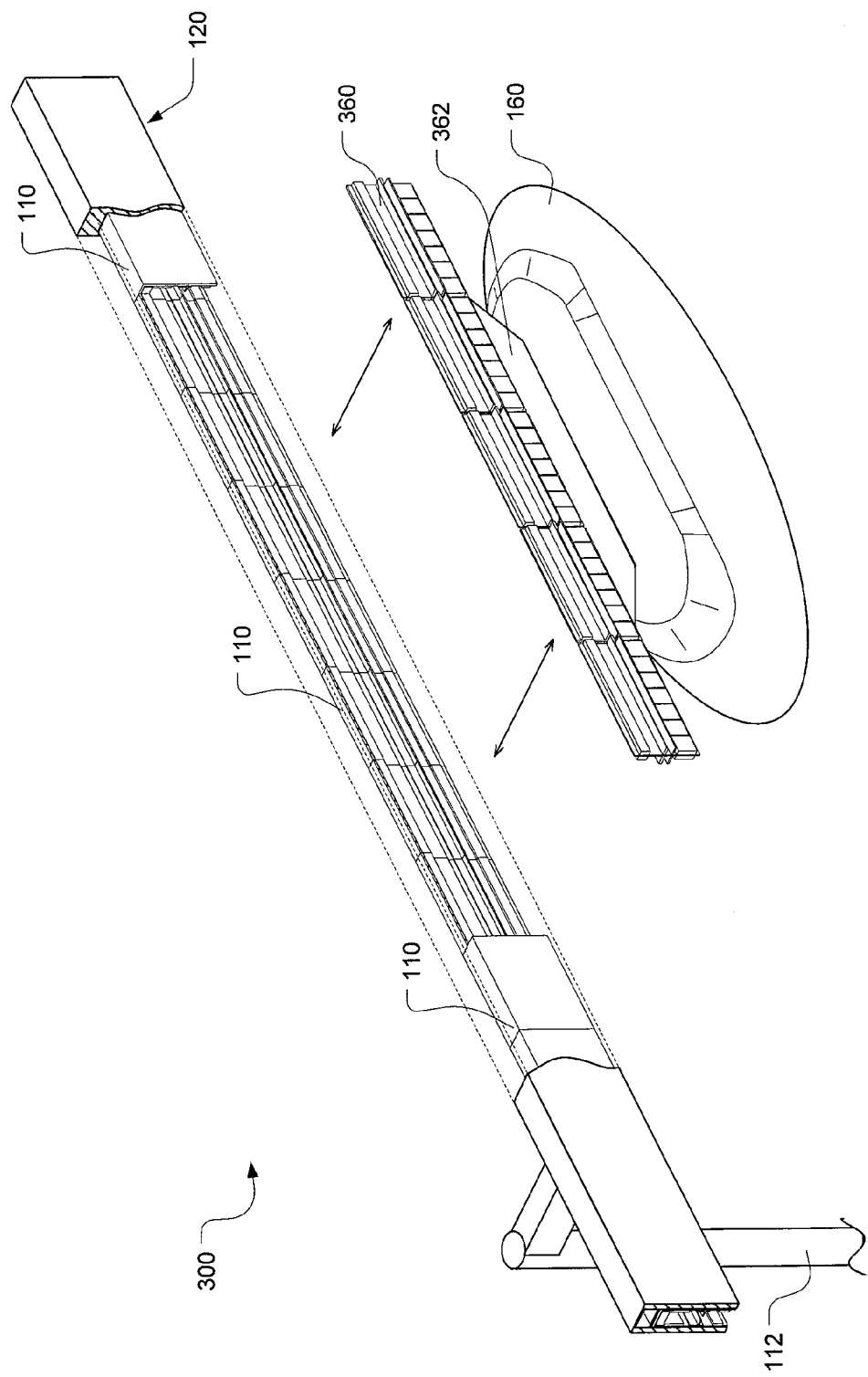
FIGS. 3A and 3B are perspective views of the networked guideway system of FIG. 1A showing an exposed view of bogie segments of the vehicle bogie in accordance with an embodiment of the present invention.
Figure 3B:
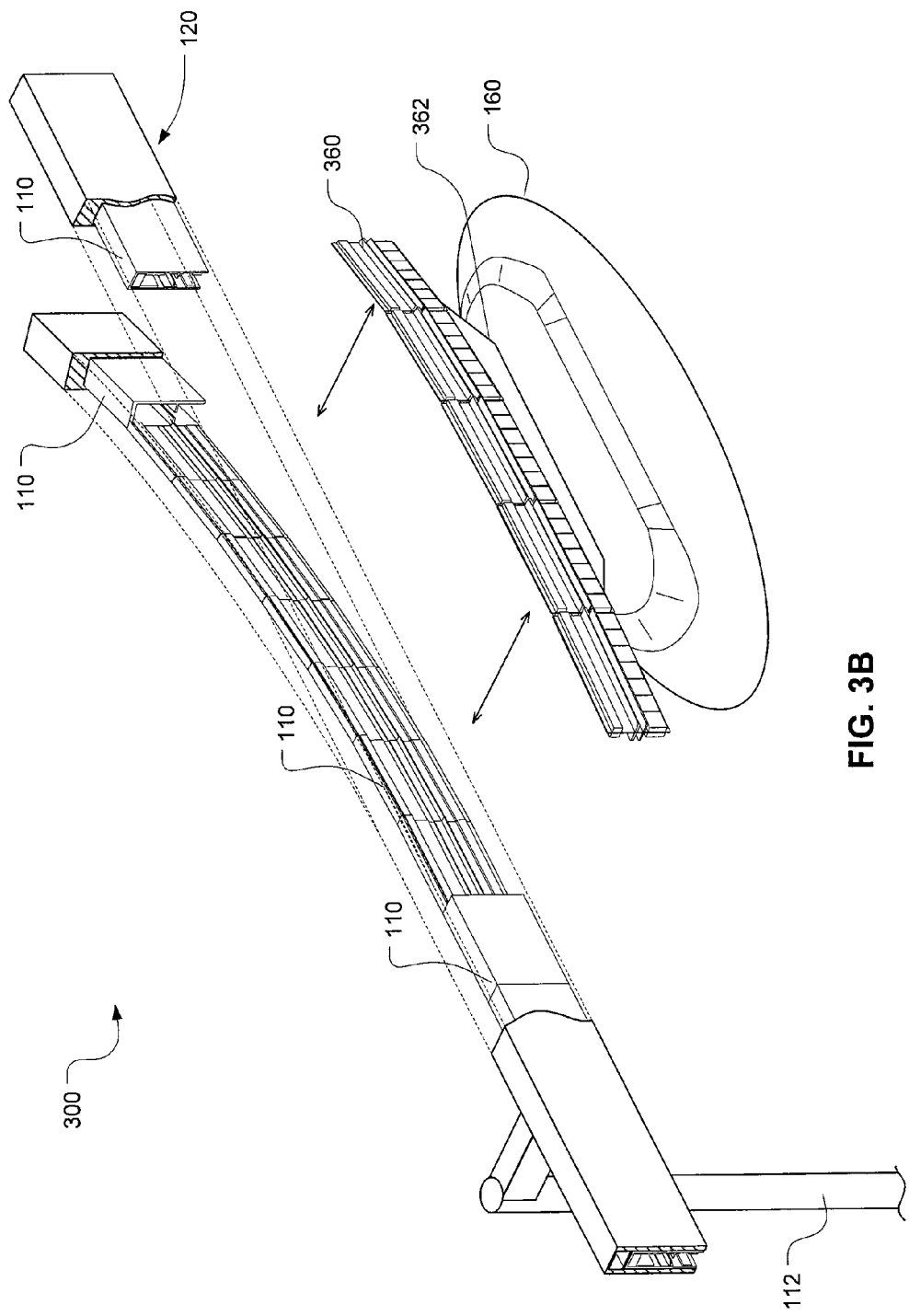

FIG. 3A depicts a perspective view 300 of the networked guideway transit system showing an exposed view of bogie segments. As shown, one vehicle bogie 360 may include a set of five bogie segments. In a preferred embodiment, the networked guideway transit system uses underhanging vehicles 160 to facilitate high-speed operation. The vehicle bogie 360 is mounted on vehicle attachment fin 362 that attaches the underhanging vehicle 160 to the vehicle bogie. The vehicle bogie 360 is used for supporting the underhanging vehicle 160 and for mating the underhanging vehicle 160 to the guideway 120. As described above, the lifting is generated by magnetic repulsion between permanent magnets of the PMR components in the guideway modular block 110 and the vehicle bogie 360. FIG. 3B depicts another perspective view 300 of the networked guideway transit system showing an exposed view of articulated bogie segments. Each bogie segment has a size such that the bogie segment can be nested in a modular guideway block 110. In order to navigate some portions of the guideway with tight radii, including diversion points of the guideway, the bogie segments of the vehicle bogie 360 may be articulated to flex in a horizontal dimension. That is, the bogie segments of the vehicle bogie 360 may be hinged along its vertical front and rear edges. This arrangement may leave the vehicle bogie rigid in the pitch, or vertical dimension. Moreover, in this way, the full mass of the vehicle 160 is distributed along the full length of the bogie segment. In addition, the bogie segments of the vehicle bogie 360 may be able to traverse sections of the guideway where there is not full magnetic levitation available.

In addition, it is possible to reduce the bogie size (the cross section of the bogie) by combining the motor propulsion and EDR centering functions. The small cross section of the bogie reduces its aerodynamic resistance. Thus, its mass can be minimized. The largest lateral dimension may be kept small, which facilitates good track switch design. It should be noted that the roll stability of the bogie is not dependent on the lateral spread between the primary lifting PMR components, but rather is achieved by the vertical spread between the EDR centering components.

In one embodiment, several modular guideway blocks may be loaded into a shell that forms the guideway structure beam to carry the load. The weight of the guideway beam is mostly static mass, not vehicle mass. Further, by using materials and methods designed to minimize the static weight, cost and physical size of the guideway beam, the supporting structure of the guideway (guideway beam) can be easily erected and the modular guideway blocks can be inserted with simple equipment. Further, the installation cost is minimized by the modular nature of the guideway components, which can be manufactured in a controlled factory environment using mass production methods.

Figure 4B:
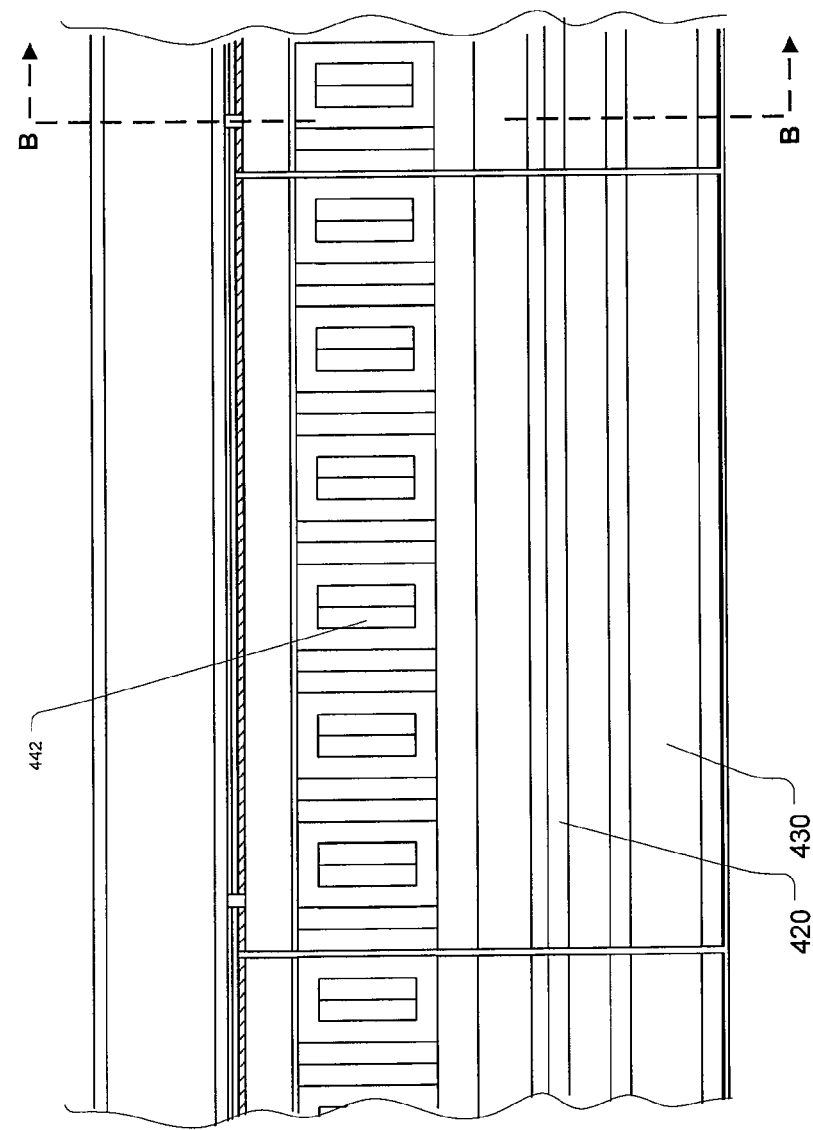
FIGS. 4A and 4B are cross-sectional views of an exemplary embodiment of the modular guideway block used in the networked guideway system.
Figure 4A:
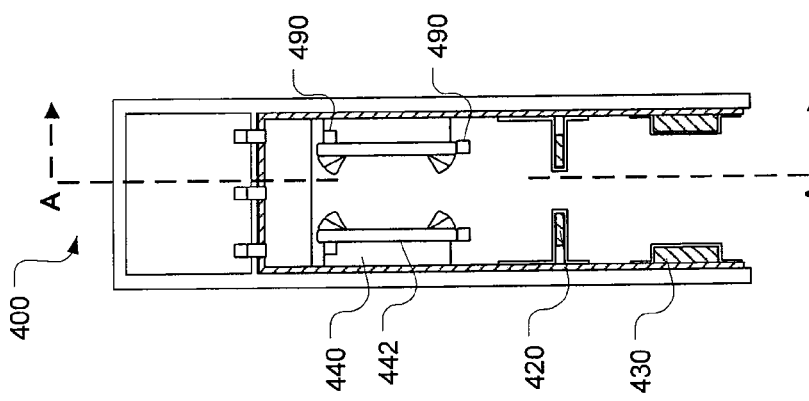
Figure 5:
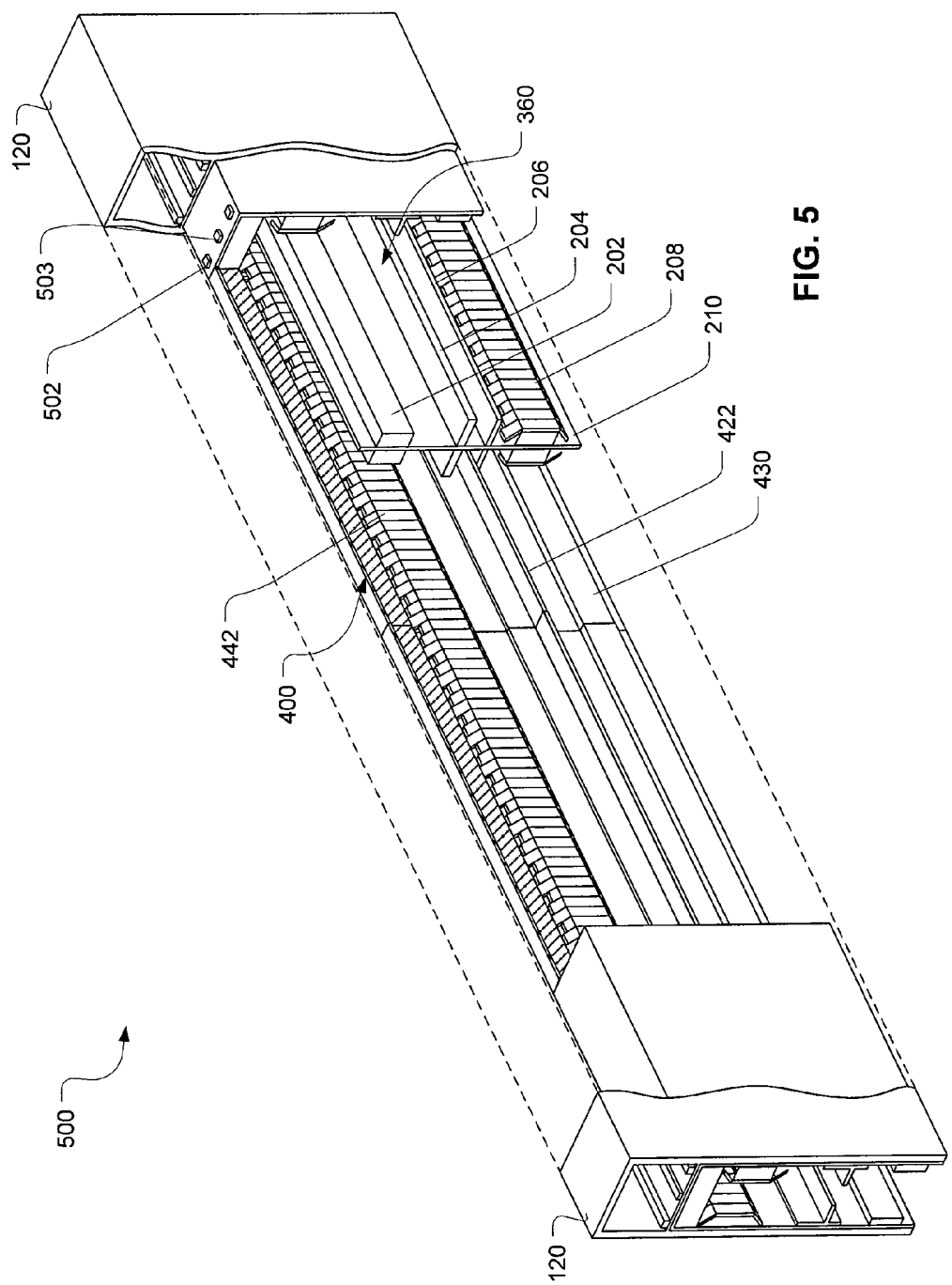
FIG. 5 depicts a cross sectional view of an exemplary embodiment of a portion of guideway showing a bogie segment nested in a modular block guideway.

The modular guideway block of the networked guideway transit system will now be described in more detail. In FIGS. 4A and 4B, cross sectional views of the modular guideway block are depicted in accordance with an embodiment of the present invention. FIG. 5 depicts a cut away view 500 of a portion of guideway showing a bogie segment 360 nested in a modular guideway block 400 in accordance with an embodiment of the present invention.

The modular guideway block 400 also comprises several PMR components that may be linear arrays of high field permanent magnets. Generally, there are two or more linear static magnetic arrays in the modular guideway block 400 as the PMR components. In one embodiment, the modular guideway block 400 includes a first PMR component, for example a guideway lifting magnet unit 420, that provides primary lifting and vertical clamping forces. As will be appreciated, the primary lift forces are produced by static magnets in the first PMR component arranged in homopolar linear arrays, the long axis of the arrays aligned in the travel direction of the moving vehicle. The modular guideway block 400 further includes a second EDR component, for example a guideway propulsion magnet unit 430, that provides primary centering forces and auxiliary propulsion forces. Permanent magnets used in the guideway lifting magnet unit 420 and the guideway propulsion magnet unit 430 may vary in size depending on track locations.

The modular guideway block 400 further comprises EDR centering components, such as guideway propulsion coils 442, that passively centers a moving vehicle bogie. That is, the EDR centering components of the modular guideway block 400 and the EDR magnets of the bogie segment 200 constitute an EDR centering subsystem that controls and centers the moving bogie via the interaction between the EDR magnets and electrically conductive elements in the networked guideway transit system. There are various ways to implement the EDR centering components. For example, when the vehicle bogie is at standstill or moving at low speeds (e.g., below a few meters per second), the EDR centering components in the modular guideway blocks are not effective. In this case, centering rollers or skids (not shown) keep the vehicle bogie laterally centered. It is noted that the locations of the EDR magnets and the EDR centering components of the EDR centering subsystem may be exchanged so that various embodiments can include any suitable arrangements of the permanent magnets and coils. One non-limiting example of implementing the EDR centering subsystem is depicted later in FIG. 6.

As discussed above, the PMR components and the EDR centering components included in the bogie segments and/or the guideway modular blocks perform well as a means of conveyance in the networked guideway transport system 100. That is, the levitation (lift force) produced by the PMR components has good lift to magnet mass ratio, a significantly low drag at all speeds and can ride over small gaps between adjacent sections. As such, the PMR components used in the bogie segments and the modular guideway blocks can be compact, much smaller than wheels of the same carrying capacity and suspension stiffness. The PMR components have no rotational inertia and lower mass than a comparable wheel system.

To control possible lateral instability in the PMR components and to maintain the alignment of the lifting magnets (PMR components), one or more EDR centering subsystems are used in the described embodiments. The EDR centering subsystem comprises electrically conductive elements, for example the guideway propulsion coils 442, that are in relative motion to the magnetic sources (e.g., propulsion magnet units). As the magnetic flux varies within the conductors, electrical currents are induced to flow. The interaction of those currents with the magnetic fields produces forces with drag and repulsion components. As discussed above, the EDR centering subsystem has the advantage of producing nearly constant force over a large range of transverse displacement. Thus, the EDR centering subsystem works well when displaced in a direction normal to the travel direction and the force direction. Also, the force increases as the separation between the magnets and conductors decreases, making the arrangement stable in that axis.

In one embodiment, the networked guideway transit system may utilize a dual EDR arrangement that includes two magnetic arrays facing a set of conductors, or conversely a set of linked conductor arrays bracketing a magnetic array. The restoring force may increase as the center element moves farther off the center plane in the dual EDR arrangements. These attributes make EDR centering subsystems complementary to the characteristics of the PMR components lifting arrangement in the networked guideway transit system.

As will be appreciated, there are a number of ways to implement EDR subsystems in conjunction with the networked guideway transit system. One non-limiting exemplary way of implementing the EDR subsystem is depicted in FIG. 6.

Figure 6:
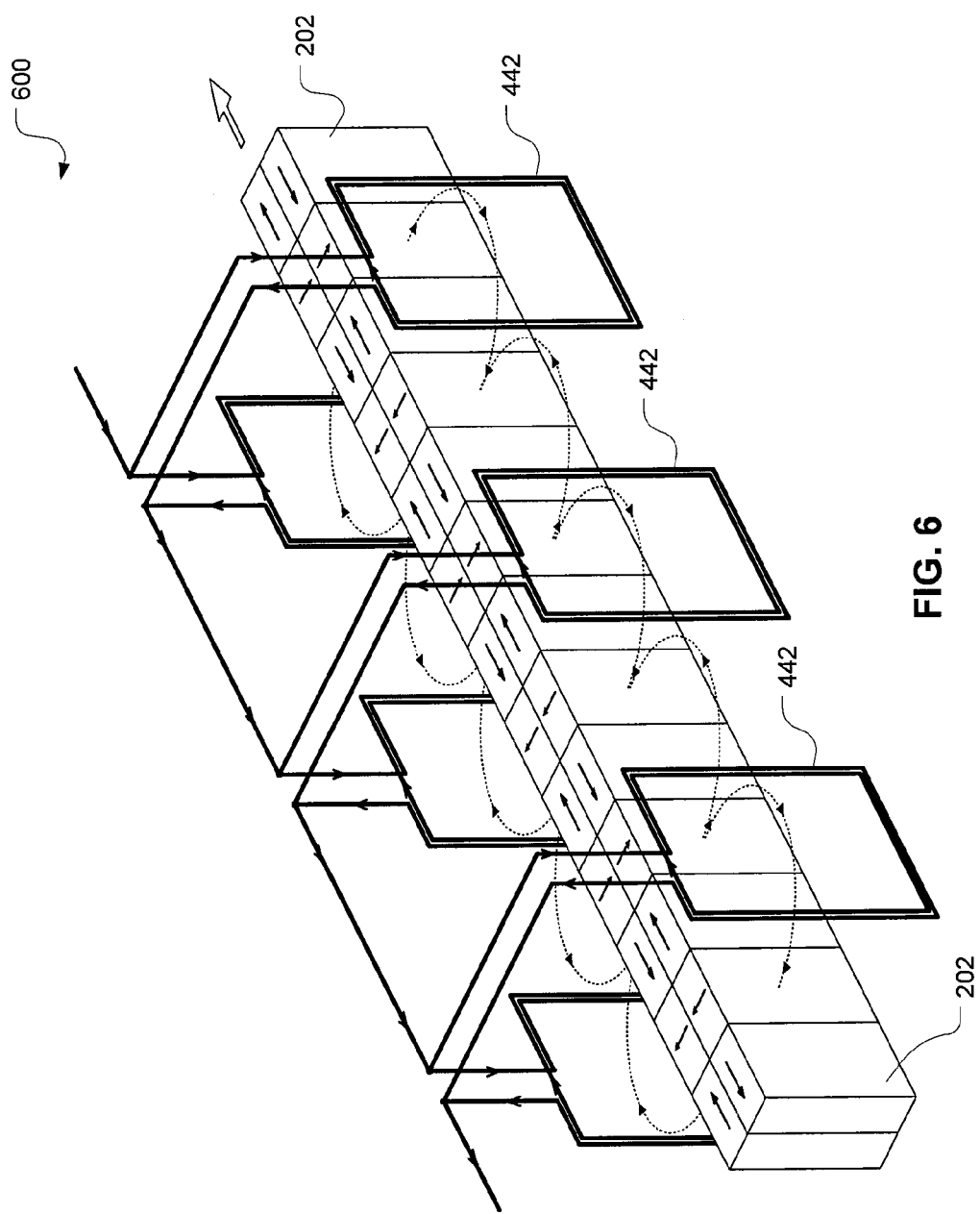
FIG. 6 depicts an exemplary way of implementing the EDR centering subsystem in the networked guideway system.

As shown in FIG. 6, the permanent magnet arrays (EDR magnets) in the bogie segment are located at the center with coils that are used as passive centering device. The coils, such as guideway propulsion coils 442, are connected in laterally opposite pairs in such a way that the motion induced voltages cancel when the magnet arrays are laterally equidistant from the coils. In this embodiment, if the permanent magnet arrays are closer to one side than the other, current flows within each coil pair and the forces tends to push the magnets back to a center position. Both arrangements are present in embodiments discussed in conjunction with FIGS. 2A, 2B, 4A and 4B above. In the embodiments, electrical energy can be transmitted from the guideway to the bogie-vehicle or vice versa.

The degree of roll stability required on any particular section of the guideway is determined by several factors, including the curvature of the guideway, the speed of travel, the mass of the vehicle, and the position of the vehicle, among others. Some of such factors can be controlled for a particular period or position of the guideway magnetic fields. For example, in a turn where the bogie-vehicle mass pushes against the outer wall of the guideway larger fixed magnets could be installed, while on the inner wall smaller magnets could be used. In this way, the centering force could be biased to anticipate and compensate for required centripetal turning force. It is also possible to drive the EDR coils, for example the propulsion coils 208, 442 (FIGS. 2A, 4A), in such a way as to produce an active lateral force. This arrangement can be used in high-speed turns to reduce the magnetic drag incurred by the large passively induced currents that would otherwise be present. Generally, the energy required to actively drive the EDR coils to produce lateral force is on the order of one fourth that required for producing the same force by passive induction.

In an alternative embodiment, the networked guideway transit system may include a series connection of multiple coils to increase inductance of the EDR centering subsystems, which tends to reduce overall centering force but also reduce magnetic drag and the velocity at which the drag force transitions to centering force. This may be used for a lower speed section of the guideway. Likewise, the series or parallel connection of multiple coil pairs to the electrical drive or sinking circuits affects the magnitude of the induced voltage and can be optimized for the expected operational speed and power source characteristics.

Referring now to FIGS. 7A-7C, cross sectional views of exemplary embodiments of a portion of guideway including a modular guideway block and a bogie segment are depicted. As shown in FIG. 7A, an exemplary embodiment 710 includes the EDR components that are shown as inwardly pointed permanent magnet arrays 430 in the guideway, outwardly focused permanent magnet arrays 202 on the bogie, and propulsion coils 442, 208. Motion in the travel direction induces voltages within the guideway propulsion coils 442 in the guideway and coils 208 on the vehicle bogie. In both cases, the coils are connected in laterally opposite pairs such that the motion-induced voltages within the coils tend to oppose when the vehicle bogie is on the center plane. This results in no current flow within the coils.

When the vehicle bogie is biased toward one side of the guideway the voltages increase in the coils on that side and decrease in the coils on the opposite side. This results in a forward current in the coils on the close side and a back current in the coils on the far side. The close side experiences repulsion while the far side experiences attraction. This tends to bring the bogie back toward the center plane. The lack of currents when the bogie is at the center plane results in very low magnetic drag at that position. Because there are laterally constraining forces high and low, the bogie is resistant to rolling. The underhanging vehicle 160 (FIG. 3A) can be damped in its swinging motion with the resulting reaction forces taken up by the bogie and transmitted to the guideway without mechanical contact. Both the upper and lower centering elements in this configuration can contribute to propulsion.

As shown in FIG. 7B, an exemplary embodiment 720 includes the PMR components and the upper lateral centering elements similar to the exemplary embodiment 710 described above and a modified EDR subsystem. As with the exemplary embodiment 710, the upper lateral centering elements may function as the primary motor in the exemplary embodiment 720. The exemplary embodiment 720 may include lower centering elements having an EDR arrangement that uses a stack of planar conductive elements 290 or a so-called ladder track instead of coils. The stack of planar conductive elements 290 is a passive electrical conductor array. The PMR components, such as guideway propulsion magnet unit 430, of the guideway are focused inward onto this conductor array. As the vehicle bogie moves, voltages are induced within the conductors. Because the guideway magnets, such as the guideway propulsion magnet unit 430, are arranged so that their lateral fluxes are oppositely directed there is a steep gradient in the lateral flux density with lateral position, with lateral flux density tending to zero at the center plane. The induced voltages are strongly dependent on the lateral flux components so at center plane minimum voltages occur.

As in the previous embodiment the voltages give rise to currents within the conductors and the interaction between these currents and components of the magnetic flux field tend to push the conductor stack (and thus the bogie) back toward the center plane. Because there are laterally constraining forces high and low the bogie is resistant to rolling and the underhanging vehicle 160 (FIG. 3A) can be damped in its swinging motion. The resulting reaction forces taken up by the bogie may be transmitted to the guideway without mechanical contact. The advantages that the exemplary embodiment 720 has are simpler construction of the conductor array compared to the motor coils, and more powerful centering force for the same magnetic array size. In fact, the exemplary embodiment 720 produces the strongest centering forces for a given size of centering element and it produces those strong centering forces near the pivot point where they are maximally effective at controlling lateral displacement of the vehicle.

As shown in FIG. 7C, an exemplary embodiment 730 includes several permanent magnet components and upper lateral centering elements in a similar manner to the exemplary embodiment 710. The lower centering elements in this embodiment 730 are also the same as the upper centering elements, including the guideway propulsion coils 442 and a permanent magnet component 202 for flux generation. This exemplary embodiment 730 has the advantage of additional propulsion power from motor coils with guideway-sourced power. Also, significantly, this embodiment 730 uses much less magnet mass in the guideway, which may lead to substantial cost reductions in construction.

Referring now to FIGS. 7D-7F, more exemplary embodiments are depicted. As shown, bogie segments of these embodiments do not include clamping magnets 206 (FIG. 2) for providing vertical clamping forces. Instead, the exemplary embodiments 740, 750, 760, include two EDR centering subsystems. The upper subsystem comprises a linear motor with bogie propulsion magnet arrays 202, a guideway located drive module 449 and guideway propulsion coils 442. Motion in the travel direction induces voltages within the guideway propulsion coils 442. The coils are connected in laterally opposite pairs such that the motion-induced voltages within the coils tend to oppose when the bogie is on the center plane. This results in no current flow within the coils. When the bogie is biased toward one side of the guideway the voltages increase in the coils on that side and decrease in the coils on the opposite side. This results in a forward current in the coils on the close side and a back current in the coils on the far side. The close side experiences repulsion while the far side experiences attraction. This tends to bring the bogie back toward the center plane. The lack of currents when the bogie is at the center plane results in very low magnetic drag at that position.

The lower EDR centering subsystem comprises a pair of EDR components, such as guideway based planar conductor stacks 290 as shown. The same magnets 202 that provide the flux for the motor and centering in the upper subsystem provide flux for the lower subsystem. In this case, the magnets are above the conductors but overlap by a small fraction of the conductor height. The transverse flux of the magnet arrays induces currents to flow within the guideway based planar conductor stacks 290. The magnitude of the currents varies with the flux density and with the degree of overlap between the magnets and the conductors. When the magnets are closer to one side the flux density, and thus the induced current, is greater. When the overlap is greater the induced current is also greater. The pattern of conductive pathways within the stacks is such that the induced currents flow through vertically oriented paths and are concentrated in the upper and lower edges of the stacks. The interaction of the longitudinal components of the magnetic fields and the electrical currents through the vertical conductors causes forces that tend to push the conductors away from the magnets. Since the magnitude of the force is dependent on the magnitude of the electrical currents, the closer the magnets are to the conductors the larger the repulsion force between them. The electrical currents are dependent on the proximity between the magnets and the conductors, and on the magnitude of the flux density at the conductor (which also increases with decreasing distance). Thus, this may produce a laterally stable arrangement.

The interaction of the transverse components of the magnetic fields and the concentrated currents in the upper edges of the conductor stacks create forces that tend to resist the vertical overlap of magnets and conductors, in effect pushing the magnets back up out of the space between the conductor stacks. In the described embodiments, the lift generated by the motion of the bogie reduces or eliminates the requirement for the direct magnetic repulsion from the homopolar permanent magnet arrays.

While illustrative embodiments have been illustrated and described, it will be appreciated that various changes can be made therein without departing from the spirit and scope of the invention.

What is claimed is:

1. A guideway transit system comprising:
   a vehicle bogie that comprises a set of bogie segments, each bogie segment including a bogie levitation component including first and second permanent magnet components, the first permanent magnet component placed in a linear arrangement and providing upward forces for lifting a vehicle and the second permanent magnet component providing downward forces for clamping the vehicle, the vehicle bogie further including a bogie propulsion magnet component for providing propulsion on the vehicle bogie, wherein the vehicle bogie supports a vehicle in the guideway transit system; and
   a guideway that comprises a set of modular guideway blocks, each modular guideway block including a guideway levitation permanent magnet component disposed between the first and second permanent magnet components of the bogie levitation component and a guideway electrodynamic repulsion component for passively centering the vehicle bogie,
   wherein the bogie propulsion magnet component is arranged to be in opposition to the guideway electrodynamic repulsion component.

2. The system of claim 1, wherein the guideway electrodynamic repulsion component includes a guideway propulsion coils and the bogie propulsion magnet component is positioned at the center with the guideway propulsion coils.

3. The system of claim 2, wherein the guideway propulsion coils are connected in laterally opposite pairs so that the motion-induced voltage cancels when the bogie propulsion magnet component is approximately equidistant from the guideway propulsion coils.

4. The system of claim 1, wherein the set of bogie segments is nested in the set of modular guideway blocks.

5. The system of claim 4, wherein the set of modular blocks include five modular blocks.

6. The system of claim 1, wherein each bogie segment further comprises a bogie electrodynamic repulsion component for providing passive centering forces and each modular guideway block includes a pair of guideway propulsion magnet components for providing propulsion forces.

7. The system of claim 6, wherein the bogie electrodynamic repulsion component is positioned at the center with the pair of guideway propulsion magnet components.

8. The system of claim 6, wherein the bogie electrodynamic repulsion component is one of bogie propulsion coils or a stack of planar conductive elements.

9. The system of claim 8, wherein linear coils in the set of the modular guideway blocks form a contiguous linear motor.

10. The system of claim 1, wherein the system uses underhanging vehicles.

11. The system of claim 2, wherein the modular guideway block includes additional guideway propulsion coils and the bogie segment includes additional bogie propulsion magnet component that is positioned at the center with the additional guideway propulsion coils.

* * * * *